Aug. 22, 1961 F. A. LUNZER 2,996,968
PHOTOGRAPHIC CAMERA WITH MANUAL-AUTOMATIC EXPOSURE CONTROL
Filed July 18, 1958 3 Sheets-Sheet 1
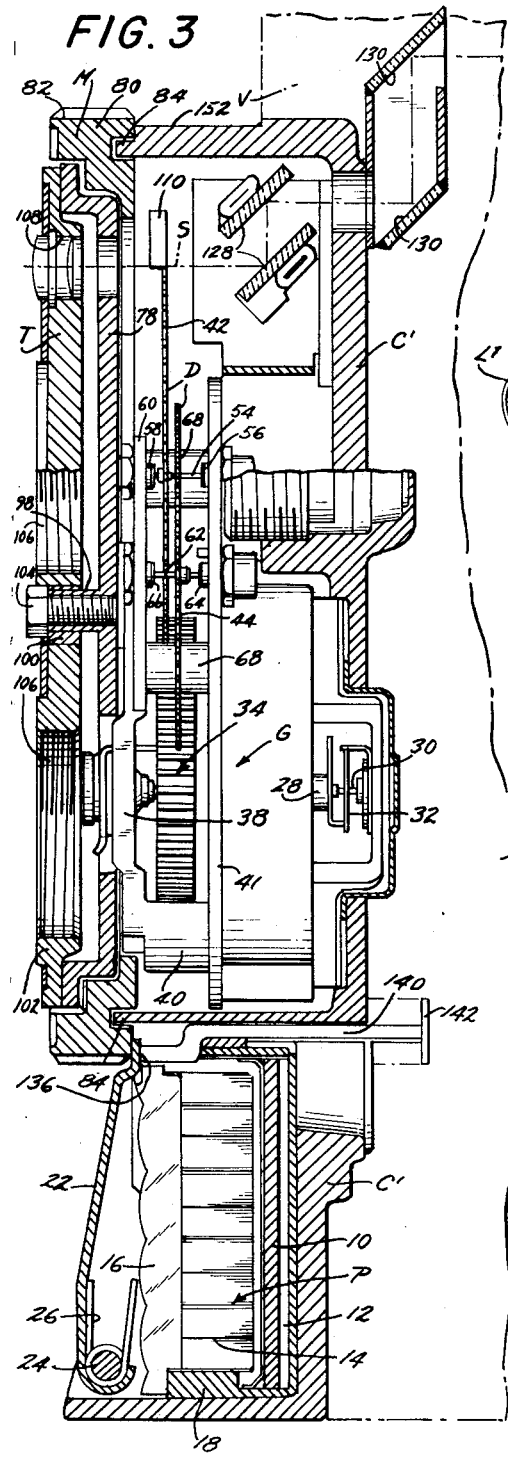
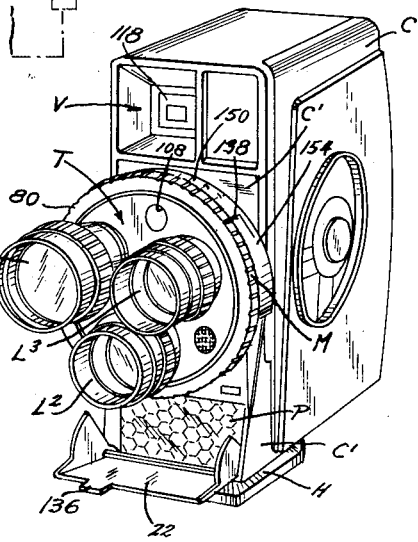
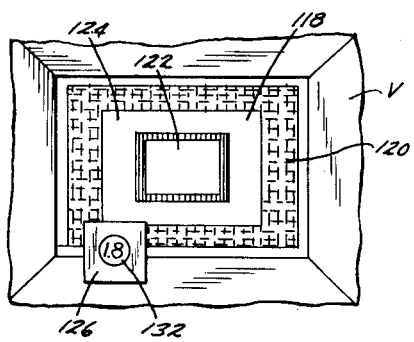
INVENTOR.
FREDRIC A. LUNZER
ATTORNEYS Aug. 22, 1961 F. A. LUNZER 2,996,968
PHOTOGRAPHIC CAMERA WITH MANUAL-AUTOMATIC EXPOSURE CONTROL
Filed July 18, 1958 3 Sheets-Sheet 2

INVENTOR.
FREDRIC A. LUNZER

ATTORNEYS

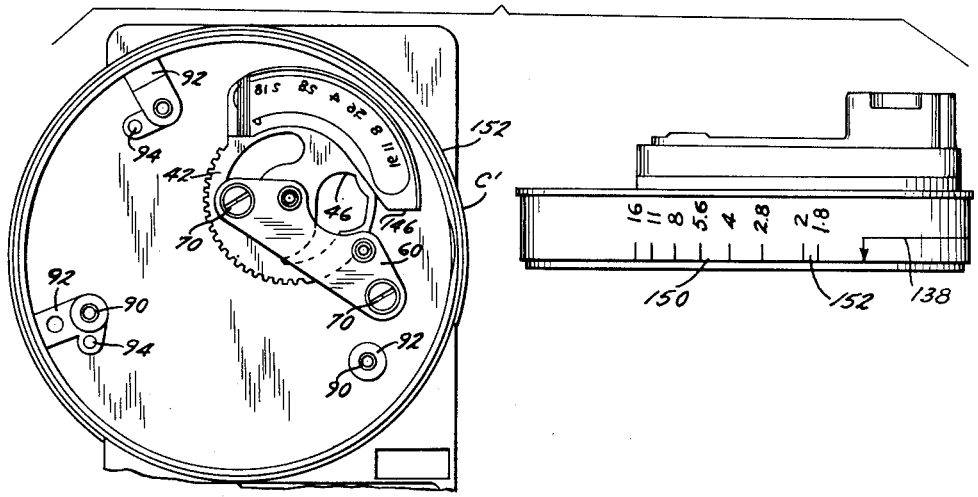
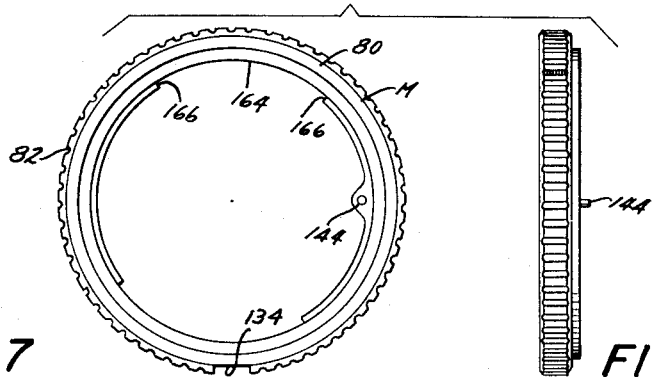
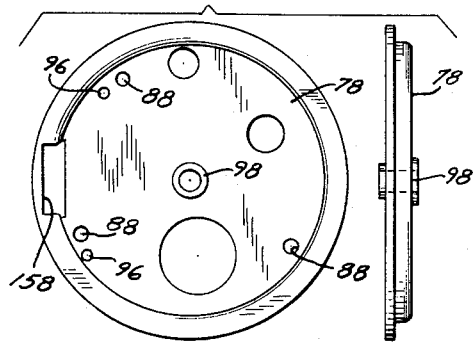
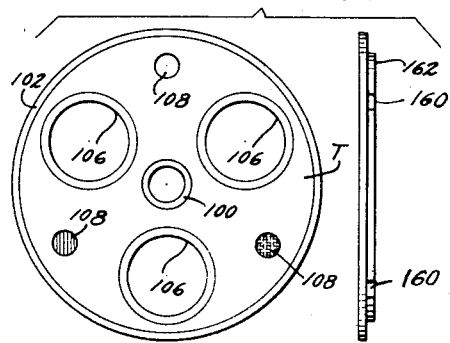

United States Patent Office 2,996,968
Patented Aug. 22, 1961

2,996,968
PHOTOGRAPHIC CAMERA WITH MANUAL-AUTOMATIC EXPOSURE CONTROL
Fredric A. Lunzer, New York, N.Y., assignor to De Jur Amsco Corporation, Long Island City, N.Y., a corporation of New York
Filed July 18, 1958, Ser. No. 749,459
19 Claims. (Cl. 95—64)

This invention relates to photographic cameras and more particularly to a combined manual and automatic exposure control apparatus for cameras such as motion picture cameras.

Apparatus for automatically controlling i.e. adjusting the diaphragm or lens opening of a camera in response to light conditions of the scene being photographed have been the subject of extensive development. In such apparatus, a light responsive device such as a photoelectric cell is circuit connected to actuate a galvanometer which in turn is connected to move and thereby adjust the diaphragm of the camera, the apparatus being so constructed and the operating sequence being such that the diaphragm or lens opening will be automatically varied in accordance with the scenic intensity of light incident upon the photoelectric cell. When used in a motion picture camera where the shutter speed is fixed or constant (as when taking pictures at the normal speed of sixteen per second), the exposure of the film may thus be wholly controlled automatically by the photo responsive automatic adjustment of the diaphragm.

The present invention has for its prime object the provision of an improved apparatus for automatically varying the lens opening by adjustment of the diaphragm in response to the given or varying light conditions of the scene being photographed.

In apparatus of this character, it is also desirable to build the camera so that the lens opening may be varied or adjusted manually by the operator in accordance with light conditions as observed by him. It is therefore a further prime object of this invention to provide an improved apparatus for enabling the selective controlling of the diaphragm adjustment either by manual means or automatically.

Where both automatic and manual adjustment or control of the lens opening is provided for, it is further highly desirable to construct and design the apparatus so that the manual and automatic adjustments are inherently mutually exclusive and so that the operator is at all times aware as to which adjustment control is in effect. It is a particular prime object of the present invention to devise a manual and automatic adjustment apparatus which meets these desired conditions.

A further principal object of the invention resides in designing and constructing the camera so that the f/stop indication or f/stop reading of the diaphragm opening may be observed by the operator upon his looking through the viewfinder of the camera. In the preferred form of the invention, the camera is provided with a lens turret carrying lenses of different ranges or fields. An ancillary object of this preferred form of invention is the devising of the camera so that in addition to being able to observe the f/stop reading through the viewfinder, the operator may also see within the area of the viewfinder an indication as to which of the turret lenses is in the picture taking position on the camera.

Other ancillary but important objects of the invention are the provision of a camera of the nature referred to in which all the parts are effectively dust-sealed, in which the parts are inter-related for both easy as well as foolproof operation, and in which the parts and mechanism of the camera are both physically as well as ornamentally well balanced.

To the accomplishment of the foregoing objects and such other objects as may hereinafter appear, the present invention relates to the photographic camera and the manual-automatic exposure control apparatus therefor, as more particularly sought to be defined in the appended claims taken together with the following specification and the accompanying drawings in which:

FIG. 1 is a perspective view of a camera embodying the structures of the present invention and showing the same in a position for automatic exposure control;

FIG. 3 is a vertical end view of the same with the casing and front plate enclosures therof taken in cross-section in the plane of the line 3—3 of FIG. 2, with parts of the latter also shown in broken away cross-section in the plane of the lens in picture taking position;

FIG. 4 is an enlarged view of the rear of the viewfinder depicting all of the information viewable within the area of the viewfinder;

FIG. 5 is a combined top plan view and front view of part of the casing shown in FIG. 2 with certain parts of the mechanism therein;

FIG. 6 is a combined front view and a side elevational view of the manual setting means for the exposure control apparatus which is mounted on the front of the casing shown in FIG. 5;

FIG. 7 is a combined front view and side elevational view of a mounting plate which is superimposed upon the manual setting means shown in FIG. 6; and FIG. 8 is a combined front view and a side elevational view of the lens turret plate which is mounted over the mounting plate of FIG. 7.

FIGS. 5 to 8 depict collectively and in sequence the manner in which the parts shown in these figures are arranged to produce the assembly shown in FIG. 3 of the drawings.

Figure 2:
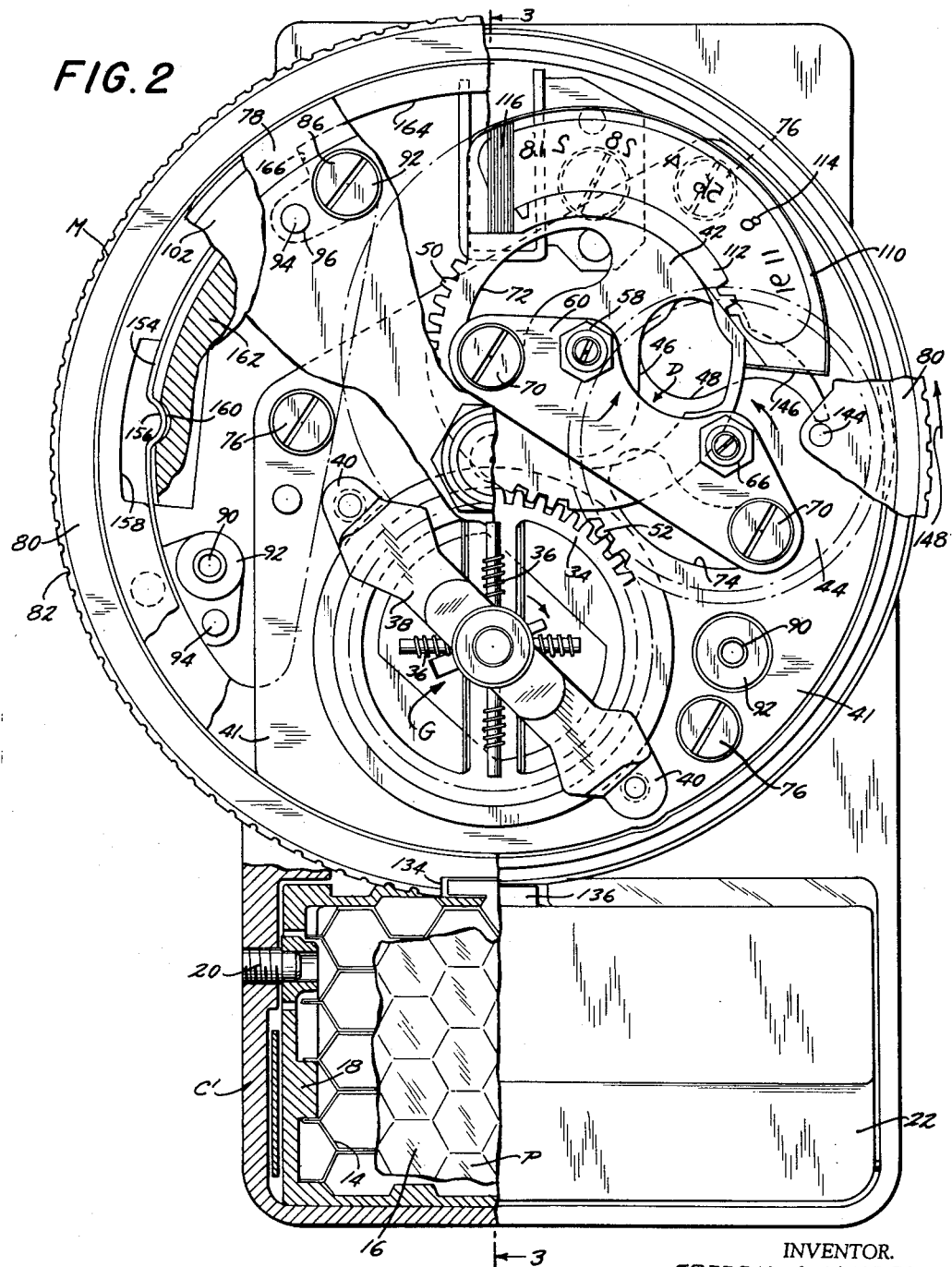
FIG. 2 is a front elevational view shown on an enlarged scale of the manual-automatic exposure control apparatus of the invention with parts shown in section and other parts broken away to expose and disclose the interior mechanism thereof.

Referring now more in detail to the drawings and having reference first to FIG. 1 thereof, the camera in the form of a motion picture camera is shown to comprise in assembly a camera casing C, a lens turret T rotatively supported on the camera, a photo responsive device P shown in open or operative condition, a viewfinder V, and a manual means M for setting the exposure either for manual or automatic control. The turret T carries a plurality of lenses of different ranges or fields such as the telephoto lens L', a wide angle lens L², and a standard lens L³, the standard lens L³ being shown in the picture taking position. The lens turret T, the photoelectric device P, the manual setting device M and the mechanism (to be described) associated therewith are all mounted on and within a subcasing C' which is received within the camera casing C. The camera is also preferably provided with a handhold H attached to the bottom wall of the camera casing.

The combined manual and automatic exposure control apparatus comprises in combination with the camera lens a diaphragm device generally designated as D, for determining the lens aperture, a galvanometer G, the photo responsive device P, the photoelectric cell of which is in circuit with said galvanometer for actuating the same in response to light incident on the photoelectric cell, the galvanometer being in turn mechanically connected to the diaphragm device D for automatically adjusting the latter in response to the action of the galvanometer, the same being combined with the manual setting means M which has independent connections to the diaphragm device D, the said manual means M being movable over a range for adjusting the diaphragm device in accordance with observed light conditions and being movable to a predetermined position at which the photo responsive device is placed into action for automatically controlling the diaphragm adjustment.

The photo responsive device P comprises a well-known assembly including the photoelectric cell, such as a selenium cell 10 mounted in a chamber 12 formed in the bottom part of the subcasing C', a honeycomb baffle 14 and a lenticular plate 16 being mounted in front of the photoelectric cell within said chamber. These parts of the photo responsive device are preferably made as a subassembly, the parts being mounted in a holder 18 which is set into the lower section of the casing C' and secured to the latter by suitable means such as the screws 20. The photo responsive device is provided with a front closure 22 hinged as at 24 to the bottom wall of the casing C' and spring biased by means of spring 26 to the open and cell exposing position shown in FIG. 1 of the drawings.

The galvanometer G is of a known construction, the rotor 28 of which is mounted in suitable jeweled bearings 30 and is biased by hair springs such as 32 to normal position. Connected to the shaft of the galvanometer rotor is a light weight gear 34 delicately balanced by the weights 36, 36, the gear being journalled at its front end to a yoke 38, the ends 40, 40 of which are secured to a mounting plate 41 (see FIG. 2). The rotor or galvanometer coil is suitably connected in circuit to the photoelectric cell 10 by wire (not shown) insulatably connecting the two, the other terminals of these elements being grounded to the casing frame.

The diaphragm device D comprises a pair of thin and light weight vanes or plates 42 and 44, the vane or plate 42 being provided with a tear shaped diaphragm opening 46, and the vane or plate 44 being provided with a correspondingly shaped diaphragm opening 48. The vane 42 has its periphery (or a part thereof) gear-toothed as at 50 and the vane or plate 44 has its periphery similarly gear-toothed as at 52, the teeth of these vanes meshing with the teeth of the gear 34 as best shown in FIG. 2 of the drawings, the arrangement being such that rotation of the gear 34 in the direction indicated by the arrow in FIG. 2 will rotate the vanes 42 and 44 in the same direction as indicated by the arrows applied thereto in said figure. These parts, as shown in FIG. 2, are in their normal position, being biased to that position by the galvanometer hair springs, the arrows indicating the direction of rotation from this normal position in response to either a manual or automatic control operation. In the normal position of these parts as shown in FIG. 2 the tear drop openings 46 and 48 are in a position to coact to produce the largest lens opening; when the vanes are moved from this normal position in the arrowed directions indicated, the tear drop openings 46 and 48 coact to progressively reduce the camera or lens opening, as is well understood in the art.

The vane 42 is mounted for rotation by means of a shaft 54 journalled at its opposite ends in a bearing 56 in the mounting plate 41 and a bearing 58 in a top plate 60; and the vane 44 is similarly mounted for rotation by means of a shaft 62 similarly journalled at its opposite ends in the bearings 64 and 66. The top plate 60 is mounted on the plate 41 by means of spacing studs 68, 68 and securing screws 70, 70. For limiting the arc of rotation of the vanes 42 and 44, the said vanes are formed with arcuate slots 72 and 74 respectively which coact with the studs 68, 68 for this purpose. The mounting plate 41 is in turn secured to the back wall of the subcasing C' by means of the three screws 76, 76 (see FIG. 2).

The lens turret T (shown in FIG. 3 with the lenses detached) and the manual setting means M for the diaphragm controls are mounted to form the front of the top section of the subcasing C' which houses the galvanometer and the diaphragm mechanisms. These are held in their mounted positions by means of a fixed cover plate 78. The relationship of these parts in their assembled condition is best shown in FIG. 3 of the drawings and is shown in their disassembled conditions in FIGS. 5 to 8 of the drawings. The manual setting means M comprises a ring 80 knurled peripherally as at 82 and otherwise shaped as shown in FIGS. 3 and 6 of the drawings for purposes to be described. The rear of this ring 80 is grooved to form with the front rim of the casing C' a rabbeted dust-proof joint or seal 84. This ring 80, thus rotatably mounted on the front of the casing C' is secured or held in position against axial movement by means of the fixed cover plate 78 (separately shown in FIG. 7 of the drawings). This plate 78 is secured to the casing C' by means of screws 86 (see upper left of FIG. 2) which are passed through orifices 88, 88 in the plate 78 and are received in tapped openings 90, 90 formed in lugs 92, 92, the latter being formed integrally with the casing C'. These lugs are also preferably formed with positioning pins 94, 94 which coact with positioning orifices 96, 96 formed in the fixed plate 78.

The turret T is in turn mounted for rotation on the fixed plate 78. To this end the plate 78 is provided centrally with a threaded thimble 98 for receiving a sleeve 100 secured at the center of the turret plate 102 forming the axis bearing for the turret. The turret is secured in position by means of a bolt 104 screwed into the thimble 98. The turret plate 102 is formed with the tapped openings 106, 106 for detachably receiving the lens L', L², and L³. In addition there are formed in the turret plate 102 a plurality of apertures 108, 108 spacedly arranged on the turret plate to correspond to the spaced arrangement thereon of the said lenses, one aperture being provided for each of the lenses, for purposes to be hereinafter described.

For indicating the position assumed by the vanes 42 and 44 of the diaphragm device D there is provided an indicator 110 attached to and forming a part of one of the vanes and preferably the vane 42. The said indicator comprises an arcuate shaped transparent or translucent strip adhesively secured at its inner rim 112 to the periphery of the vane 42. The said strip has imprinted thereon indicia 114 designating the lens openings or f/stops. This indicator 110 and the apertures 108, 108 of the turret are so relatively arranged that the indicator indicia are in the line of sight S (see FIG. 3) of any one of said apertures when the turret is moved to position a corresponding taking lens in a picture taking position. The indicator is also imprinted at one of its ends with a red stripe 116 to indicate the condition of "no light." In the normal non-operative position shown in FIG. 2 this red stripe is in the said line of sight. Preferably the turret apertures 108, 108 are filled with colored transparent elements, each aperture element being colored differently from the others to indicate in said line of sight the particular corresponding lens which is in picture taking position. Thus for the standard lens L³, the corresponding aperture 108 at the top of the turret plate may have a no color transparency, the aperture 108 corresponding to the wide angle lens L² may be colored yellow and the aperture 108 corresponding to the telephoto lens L' may be colored red, as indicated in FIG. 8 of the drawings.

The viewfinder V is provided with a finding lens 118 (see FIG. 1) and the area of this lens is also differentiatingly colored as shown in FIG. 4 of the drawings to designate the different areas for the different turret lenses. Thus the outside area 120 used for the wide angle lens has its border colored yellow, the inside area 122 used for the telephoto lens has its border colored red, and the intermediate area 124 used for the standard lens has its area uncolored. As also shown in FIG. 4 of the drawings there is also visible within the area of the viewfinder the indicia indicating the assumed position of the diaphragm device D as well as a color indication of the lens which is in the picture taking position. This is accomplished by arranging light projecting elements in the form of a system of reflectors in the line of sight S referred to so that this information is reflected to the position 126 within the viewfinder area as shown in FIG. 4. These reflectors comprise the set of parallel reflectors 128 mounted within the casing C' and a second parallel set of reflectors 130 attached to the rear of said casing C' and extending into the viewfinder chamber. With this arrangement, the operator may read off at the position 126 the f/stop such as the reading 1.8 appearing at 132, the color (red, yellow, or absence of color) at the area of the reading thus also informing the operator as to which lens is at the picture taking position.

The manual setting ring M is movable for making manual adjustments of the diaphragm and for setting the same for automatic adjustment. While both the manual and automatic adjustments are thus determinable by the movement of the ring 80 of the manual setting ring M it is desirable, as aforesaid, to make the manual and automatic adjustments inherently mutually exclusive, so that when the manual adjustment is in effect the automatic adjustment is rendered ineffective and vice versa. This is accomplished more particularly by so interconnecting and inter-relating the ring 80 and the closure 22 of the photo respective device P that when the ring is used for manual adjustment the closure 22 will be locked in closed position and conversely when the closure 22 is in its open position the ring 80 is locked against movement.

To accomplish these ends the ring 80 and the closure 22 are first constructed and inter-related as follows. The ring 80 is provided at a region in its periphery with a slot or notch 134 and the closure 22 is provided with a projection 136. Normally and during the manual adjustment of the ring, the projection 136 is engaged by the inside rim wall of the ring 80 and is thereby locked in its closed position as shown in FIG. 2, thus obscuring or shutting off the photoelectric cell. When, however, the ring 80 is rotated to a terminal position indicated by the arrowed line 138 (FIG. 1) the notch 134 comes into registry with the projection 136, the closure 22 thereby becomes disengaged permitting the same to move to the open position shown in FIG. 1 for exposing the photoelectric cell to light conditions. To lock the ring 80 when it is moved to this position there is also provided a slidable bolt 140 biased by a spring 142, the arrangement being such as shown in FIG. 3 that when the closure is released for movement to its open position the front end of the slidable bolt 140 moves into the slot or notch 134 and thereby holds or locks the ring 80 against further rotation. It will be observed that upon returning the closure 22 to its cell obscuring position (FIG. 3) the projection 136 thereof will engage the bolt 140 to move the same to its return or spring biased position. The closure and the bolt are thereafter held or locked in these positions by the rotation of the ring 80.

For effecting the manual adjustment of the diaphragm device D the ring 80 is formed integrally with a stud or pin 144 (see FIG. 2 right and FIG. 6) extending rearwardly therefrom and in a position to engage the edge 146 of the indicator 110. With this arrangement, when the ring 80 is rotated manually in the direction indicated by the arrow 148 (FIG. 2) the pin 144 will after a short interval engage the indicator 110 and move the same thereby effecting the coacting movements of the vanes 42 and 44 as well as the gear 34 in their arrow indicated directions, the movement of these parts taking place against the bias of the galvanometer hair springs. It will be noted that when the ring 80 is rotated in the reverse direction towards automatic take-over of the apparatus the vanes 42 and 44 and the gear 34 will return to their normal positions shown in FIG. 2 under the influence of the now energized galvanometer springs.

The f/stop positions of the diaphragm device in the operation just described may be read off by the operator on the f/stop indicia applied as at 150 to the outer wall 152 of the casing C'; and the same may be also read off from the indicator 110 upon looking through the viewfinder V. For indexing the position of the turret T there is provided a spring 154 provided with a bowed part 156 lodged within a recess 158 in the fixed plate 78 which springs into engagement in one of three notches 160 formed in an inset rim 162 (FIG. 8) in the turret plate 102. Also the ring 80 is rotatable only within a certain arcuate limit, and this is accomplished by providing a cutout 164 in an interior flange of the ring, the ends 166 of this cutout forming stop means which engage the uppermost lug 92 of the casing.

The construction, use and operation of the photographic camera with the manual and automatic exposure control and the various advantages thereof, while apparent from the above detailed description, may be further explained as follows:

*Manual operation.*—The manual adjustment of the diaphragm device D is made or set by the operator, by his simply rotating the ring 80 of the manual setting means M to an f/stop position on the scale 150 selected by him in accordance with his observed light conditions. Upon such manual rotation of the ring 80, the daiphragm D is operated to its adjusted position by the rotation of the diaphragm vanes 42 and 44 which rotation is effected by the pin 144 on ring 80 engaging and moving the f/stop indicator 110. Since this movement of the vanes takes place against the bias of the hair springs 32 of the galvanometer G and starting from the initial or "zero" position shown in FIG. 2, the diaphragm device D is always biased for return movement and is thus manually adjustable corresponding to the full range of movement of the ring 80.

*Normal obscuration of the photoelectric device.*—During the manual operation of the diaphragm opening, and in fact in all uses (operative and non-operative) of the camera except its use for automatic exposure control, the photoelectric device P is shut off or obscured by the closure 22, which is held closed in locked condition. In the first place, this assures that the galvanometer is not agitated by current during any of the manual operations, thus enabling the proper and effective manual operation of the diaphragm vanes (remembering that the same are biased by the hair springs of the meter) to take place. This normal obscuration of the photo-voltaic cell is furthermore greatly beneficial to the preservation of the cell itself. While it is generally understood that selenium cells are very durable and will outlast the instrument under normal conditions, they are subject to abuse through excessive heat or light or both. Such cells should not be subjected to temperatures above 60° C. since permanent damage may result; and prolonged exposure to direct sunlight results in decreased cell sensitivity. With the use of lenticular elements (such as 16), which constitute short focal "burning" elements, protection of the photoelectric device against abuse and damage becomes highly desirable. Such protection is afforded by the normal shutting off of the cell by the locked closure 22.

*Automatic operation.*—When it is desired to permit the automatic take-over of the apparatus, the operator moves the ring 80 to its end position shown in FIG. 2 of the drawings, whereupon the closure 22 springs open to the position shown in FIG. 1. It will be noted that in this end position of the ring 80, the diaphragm vanes, the galvanometer and its operated parts are in their initial or "zero" position, and they are, therefore, ready for complete automatic take-over control. The adjustment of the diaphragm is now determined solely by the light incident on the photoelectric cell P. This incident light is transformed to the energizing of the galvanometer G, and the operation of the galvanometer moves the diaphragm vanes 42 and 44 to their light responsive positions by way of the gear 34 and the vane gear teeth 50 and 52. Also, when the closure 22 is sprung open, the ring 80 is locked against movement by the bolt 140, whereby the manual M is locked against operation during the automatic control use of the camera.

*Viewfinder readings.*—Upon looking into the viewfinder V, the position assumed by the vanes of the diaphragm may be observed at the location 132 in f/stop readings on the indicator 110. For manual operations, the operator by making such readings will be enabled to verify his manually set positions of the ring 80 made by him with reference to the f/stop scale 150. In automatic use, the operator will similarly be able to read off the f/stop positions from the indicator 110. In taking motion pictures, and in moving the camera over the scene, the light conditions usually vary; and this variation as well as the automatic adjustment of the lens opening thereto will thus be viewable through the viewfinder. In addition, the operator will also be informed on the viewfinder by the color coding provided as to which lens on the turret is at the picture taking position. Also, when the lens turret is not in its proper indexed or indented position, the light path (the line of sight S) will be interrupted, thus signalling by the total darkness at the area 132 the "off" location of the lens turret.

*The camera assembly.*—The camera assembly provided presents other notable features. The delicate operating parts of the apparatus are separately encased by the subcasing C' and the manual rotatable parts such as the ring 80 and the lens turret T are so mounted on the casing as to produce a completely dust-sealed structure. Furthermore, the camera parts are so arranged that the controls are effectively manipulated by the operator handling the conveniently positioned ring 80. It is to be noted that the parts of the mechanism of the camera are also both physically and ornamentally well balanced.

While I have shown a preferred form of construction as exemplifying the principles of the invention it will be apparent that many changes may be made in the construction and arrangement of the parts without departing from the spirit of the invention defined in the accompanying claims.

I claim:

1. A combined manual and automatic exposure control apparatus for a camera comprising in combination with the camera lens, a diaphragm, a galvanometer, a photoelectric cell in circuit with said galvanometer for actuating the same in response to light incident on the photoelectric cell, means connecting the galvanometer and the diaphragm for automatically adjusting the diaphragm in response to the action of the galvanometer, a closure for obscuring the photoelectric cell, manual means having connections to said diaphragm and movable over a range for adjusting the diaphragm in accordance with observed light conditions, means operable by said manual means engaging said closure to hold the same in closed position while said manual means is moved over said range, means also operable by said manual means for disengaging said closure to permit the same to move to open position to expose the photoelectric cell to light conditions when said manual means is moved to a predetermined position, and means for locking said manual means when it is moved to said predetermined position to effect disengagement of said closure.

2. A manual and automatic exposure control apparatus for a camera comprising in combination with the camera lens, a diaphragm, a galvanometer, a photoelectric cell in circuit with said galvanometer for actuating the same in response to light incident on the photoelectric cell, means connecting the galvanometer and the diaphragm for automatically adjusting the diaphragm in response to the action of the galvanometer, a spring biased closure for obscuring the photoelectric cell, manual means having connections to said diaphragm and movable over a range for adjusting the diaphragm in accordance with observed light conditions, means operable by said manual means engaging said closure to hold the same in closed position while said manual means is moved over said range, means also operable by said manual means for disengaging said closure to permit the same to move to open position to expose the photoelectric cell to light conditions when said manual means is moved to a position at the end of said range, and means for automatically locking said manual means when it is moved to said position to effect disengagement of said closure.

3. A manual and automatic exposure control apparatus for a camera comprising in combination with the camera lens, a diaphragm, a galvanometer, a photoelectric cell in circuit with said galvanometer for actuating the same in response to light incident on the photoelectric cell, means connecting the galvanometer and the diaphragm for automatically adjusting the diaphragm in response to the action of the galvanometer, a closure for obscuring the photoelectric cell, manual means having connections to said diaphragm and movable for adjusting the diaphragm in accordance with observed light conditions, said manual means having a part engaging said closure to hold the same in closed position and a part for disengaging said closure to permit the same to move to open position to expose the photoelectric cell to light conditions, and means for automatically locking said manual means when it is moved to effect disengagement of said closure.

4. A manual and automatic exposure control apparatus for a camera comprising in combination with the camera lens, a diaphragm, a galvanometer, a photoelectric cell in circuit with said galvanometer for actuating the same in response to light incident on the photoelectric cell, means connecting the galvanometer and the diaphragm for automatically adjusting the diaphragm in response to the action of the galvanometer, a closure for obscuring the photoelectric cell, manual means having connections to said diaphragm and movable for adjusting the diaphragm in accordance with observed light conditions, said manual means having a part effective while said manual means is moved over a given range engaging said closure to hold the same in closed position and having a part effective when said manual means is moved to a predetermined position for disengaging said closure to permit the same to move to open position to expose the photoelectric cell to light conditions, and means for automatically locking said manual means when it is moved to said predetermined position to effect disengagement of said closure.

5. In a combined manual and automatic exposure control apparatus for a camera comprising in combination with a camera lens, a diaphragm, a galvanometer connected to the diaphragm for automatically adjusting the diaphragm, a photoelectric cell in circuit with the galvanometer, a closure for obscuring the photoelectric cell, and a manual means having connections to the diaphragm for independently adjusting the diaphragm, of mechanism for interconnecting the automatic and manual operations of said diaphragm, said mechanism comprising means operable by said manual means engaging said closure to lock the same in closed position while said manual means is moved over a range of observed light conditions, means also operable by said manual means for disengaging said closure to permit the same to move to open position to expose the photoelectric cell to light conditions when said manual means is moved to a predetermined position, means for automatically locking said manual means when it is moved to said predetermined position to effect disengagament of said closure, and means effective when the closure is returned to cell obscuring position for returning said locking means to a position for unlocking said manual means.

6. In a combined manual and automatic exposure control apparatus for a camera comprising in combination with a camera lens, a diaphragm, a galvanometer connected to the diaphragm for automatically adjusting the diaphragm, a photoelectric cell in circuit with the galvanometer, a spring biased closure for obscuring the photoelectric cell, and a manual means having connections to the diaphragm for independently adjusting the diaphragm, of mechanism for interconnecting the automatic and manual operations of said diaphragm, said mechanism comprising a part on said manual means engaging said closure to lock the same in closed position while said manual means is moved over a range of observed light conditions, a part on said manual means for disengaging said closure to permit the same to move to open position to expose the photoelectric cell to light conditions when said manual means is moved to a predetermined position, and means for automatically locking said manual means when it is moved to said predetermined position to effect disengagement of said closure.

7. In a combined manual and automatic exposure control apparatus for a camera comprising in combination with a camera lens, a diaphragm, a galvanometer connected to the diaphragm for automatically adjusting the diaphragm, a photoelectric cell in circuit with the galvanometer, a spring biased closure for obscuring the photoelectric cell, and a manual means having connections to the diaphragm for independently adjusting the diaphragm, of mechanism for interconnecting the automatic and manual operations of said diaphragm, said mechanism comprising a part on said manual means engaging said closure to lock the same in closed position while said manual means is moved over a range of observed light conditions, a part on said manual means for disengaging said closure to permit the same to move to open position to expose the photoelectric cell to light conditions when said manual means is moved to a position at an end of said range, means for automatically locking said manual means when it is moved to said predetermined position to effect disengagement of said closure, and means effective when the closure is returned to cell obscuring position for returning said locking means to a position for unlocking said manual means.

8. The apparatus of claim 6 in which said manual means comprises a ring mounted for rotation on the camera, the rim of said ring comprises the part for engaging the closure to lock the same in closed position, a slot in the rim of said ring comprises the part for permitting disengagement of the closure and in which said locking means comprises a spring biased bolt which coacts with said slot for locking the ring.

9. The apparatus of claim 7 in which said manual means comprises a ring mounted for rotation on the camera, the rim of said ring comprises the part for engaging the closure to lock the same in closed position, a slot in the rim of the ring comprises the part for permitting disengagement of the closure, in which the locking means comprises a spring biased bolt which coacts with said slot for locking the ring and in which the means for returning the locking means comprises a part on said closure arranged to engage the projecting end of said bolt when the closure is moved to its cell obscuring position.

10. In a photographic camera, a lens turret rotatably mounted on said camera, a plurality of lenses spacedly arranged on said lens turret, a camera diaphragm, a ring rotatably mounted on said camera and arranged coaxially with said lens turret, a connection between said ring and said diaphragm for manually adjusting the diaphragm upon rotation of said ring, a photoelectric cell on said camera, a closure for obscuring said cell, coacting means on said ring and said closure for locking the closure over a range of rotation of said ring, and coacting means on said ring and said closure for unlocking said closure upon movement of said ring to a predetermined position.

11. In the photographic camera of claim 10, a locking element coacting with said ring for locking the ring when the same is moved to said predetermined position.

12. In the photographic camera of claim 11, coacting means on said closure and said locking element for moving the latter to a ring unlocking position upon movement of the closure to cell obscuring position.

13. In a photographic camera, a camera diaphragm, a ring rotatably mounted on said camera, a connection between said ring and said diaphragm for manually adjusting the diaphragm upon rotation of said ring, a photoelectric cell on said camera, connected with said diaphragm, a closure for obscuring said cell, coacting means on said ring and said closure for locking the closure over a range of rotation of said ring, coacting means on said ring and said closure for unlocking said closure upon movement of said ring to a predetermined position, and a locking element coacting with said ring for locking the ring when the same is moved to said predetermined position.

14. In a photographic camera, a lens turret rotatably mounted on said camera, a plurality of lenses spacedly arranged on said lens turret, a camera diaphragm, a ring rotatably mounted on said camera and arranged coaxially with said lens turret, a connection between said ring and said diaphragm for manually adjusting the diaphragm upon rotation of said ring, a photoelectric cell on said camera arranged below said turret and said ring, a closure for obscuring said cell, coacting means on said ring and said closure for locking the closure over a range of rotation of said ring and coacting means on said ring and said closure for unlocking said closure upon movement of said ring to a predetermined position.

15. A combined manual and automatic exposure control apparatus for a camera comprising in combination with the camera lens, a diaphragm, a galvanometer, a photoelectric cell in circuit with said galvanometer for actuating the same in response to light incident on the photoelectric cell, means connecting the galvanometer and the diaphragm for automatically adjusting the diaphragm in response to the action of the galvanometer, manual means having connections to said diaphragm and movable for adjusting the diaphragm in accordance with observed light conditions, a closure for obscuring the photoelectric cell, said manual means having a part engaging said closure to hold the same in closed position during all operations of said diaphragm by said manual means.

16. In a photographic camera, a camera diaphragm, a ring rotatably mounted on said camera, a connection between said ring and said diaphragm for manually adjusting the diaphragm upon rotation of said ring, a photoelectric cell on said camera, connections between the photoelectric cell and said diaphragm for automatically operating the latter, a closure for obscuring said cell, coacting means on said ring and said closure for locking the closure over a range of rotation of said ring, and coacting means on said ring and said closure for unlocking said closure upon movement of said ring to a predetermined position.

17. A combined manual and automatic exposure control apparatus for a camera comprising in combination with the camera lens, a diaphragm, a galvanometer, a photoelectric cell in circuit with said galvanometer for actuating the same in response to light incident on the photoelectric cell, means connecting the galvanometer and the diaphragm for automatically adjusting the diaphragm in response to the action of the galvanometer, manual means having connections to said diaphragm and movable for adjusting the diaphragm in accordance with observed light conditions, a closure for obscuring the photoelectric cell, and means operable by said manual means engaging said closure to hold the same in closed position during all operations of said diaphragm by said manual means.

18. A combined manual and automatic exposure control apparatus for a camera comprising in combination with the camera lens, a diaphragm, a galvanometer, a photoelectric cell in circuit with said galvanometer for actuating the same in response to light incident on the photoelectric cell, means connecting the galvanometer and the diaphragm for automatically adjusting the diaphragm in response to the action of the galvanometer, manual means having connections to said diaphragm and movable for adjusting the diaphragm in accordance with observed light conditions, a closure for obscuring the photoelectric cell, means operable by said manual means engaging said closure to hold the same in closed position during all operations of said diaphragm by said manual means, and means also operable by said manual means disengaging said closure to permit the same to move to open position to expose the photoelectric cell to light conditions when said manual means is moved to a predetermined position.

19. A combined manual and automatic exposure control apparatus for a camera comprising in combination with the camera lens, a diaphragm, a galvanometer, a photoelectric cell in circuit with said galvanometer for actuating the same in response to light incident on the photoelectric cell, means connecting the galvanometer and the diaphragm for automatically adjusting the diaphragm in response to the action of the galvanometer, a closure for observing the photoelectric cell, manual means having connections to said diaphragm and movable over a range for adjusting the diaphragm in accordance with observed light conditions, means for holding said closure in closed position while said manual means is moved over said range, means operable by said manual means for disengaging said closure to permit the same to move to open position to expose the photoelectric cell to light conditions when said manual means is moved to a predetermined position, and means for locking said manual means when it is moved to said predetermined position to effect disengagement of said closure.

References Cited in the file of this patent

UNITED STATES PATENTS

| | | |
|---|---|---|
| 2,058,562 | Bucky et al. | Oct. 27, 1936 |
| 2,184,017 | Mihalyi | Dec. 19, 1939 |
| 2,271,222 | Eagle | Jan. 27, 1942 |
| 2,297,262 | Tonnies | Sept. 29, 1942 |
| 2,556,546 | Lee | June 12, 1951 |
| 2,599,327 | Haeseler | June 3, 1952 |
| 2,655,086 | Walker | Oct. 13, 1953 |
| 2,741,965 | Thevenaz | Apr. 17, 1956 |
| 2,841,064 | Bagby et al. | July 1, 1958 |
| 2,865,274 | Richartz | Dec. 23, 1958 |